United States Patent [19]

Inui et al.

[11] Patent Number: 4,614,691

[45] Date of Patent: Sep. 30, 1986

[54] METHOD FOR PRODUCTION OF METAL SHEET COVERED WITH POLYESTER RESIN FILM

[75] Inventors: Tsuneo Inui; Atsuo Tanaka; Tetsuhiro Hanabusa; Harunori Kubota, all of Yamaguchi, Japan

[73] Assignee: Toyo Kohan Co., Ltd., Tokyo, Japan

[21] Appl. No.: 656,732

[22] Filed: Oct. 1, 1984

[51] Int. Cl.⁴ .................................... B21D 39/00
[52] U.S. Cl. .................................... 428/623; 156/151; 156/307.5; 156/310; 156/319; 156/322; 156/324; 156/330; 427/405; 428/414
[58] Field of Search ............... 156/151, 307.5, 310, 156/322, 319, 324, 330; 428/623, 414; 427/405

[56] References Cited

U.S. PATENT DOCUMENTS

| | | | |
|---|---|---|---|
| 2,861,022 | 11/1958 | Lundsager | 156/322 |
| 3,671,205 | 6/1972 | Uchida et al. | 428/623 |
| 3,826,628 | 7/1974 | Addinall et al. | 428/623 |
| 3,978,803 | 9/1976 | Asano et al. | 427/405 |
| 4,455,355 | 6/1984 | Inui et al. | 428/623 |

FOREIGN PATENT DOCUMENTS 55-139263  10/1980  Japan ................... 156/330

*Primary Examiner*—John J. Gallagher
*Attorney, Agent, or Firm*—Wenderoth, Lind & Ponack

[57] ABSTRACT

A method for the production of a metal sheet covered with polyester resin film which comprises laminating a biaxially oriented polyester resin film which has been precoated uniformly with a small amount of an epoxy resin containing a curing agent of epoxy resin to a metal sheet covered with double layer consisting of an upper layer of hydrated chromium oxide and a lower layer of metallic chromium, which metal sheet has been heated to a temperature of 220° C. to below the melting point of polyester resin film, in the condition wherein the surface of said polyester resin film precoated with an epoxy resin containing the curing agent of epoxy resin contacts the metal sheet.

This metal sheet covered with polyester resin film is excellent in corrosion resistance and adhesion of polyester resin film to the metal sheet after any severe forming.

18 Claims, No Drawings

METHOD FOR PRODUCTION OF METAL SHEET COVERED WITH POLYESTER RESIN FILM

FIELD OF THE INVENTION

The present invention relates to a method for the production of a metal sheet covered with biaxially oriented polyester resin film. The method comprises laminating the resin film precoated with epoxy resin containing a curing agent of epoxy resin to a metal sheet covered with double layers consisting of an upper layer of hydrated chromium oxide and a lower layer of metallic chromium, which metal sheet has been heated to a temperature of 220° C. to below the melting point of polyester film just before the lamination of said polyester resin film, in the condition wherein the one side of polyester resin film precoated with epoxy resin containing a curing agent of epoxy resin contacts the metal sheet.

BACKGROUND AND OBJECTIVES

At present, organic resin film laminated metal sheets are widely used in various fields such as electrical components, furniture and building materials. In general, there are two well known methods for continuous lamination of an organic resin film on the surface of the metal sheet. The first method is one in which an adhesive coated metal sheet is used. Namely, at first the adhesive in which thermosetting resin is mainly dissolved in a solvent, is coated on the surface of the metal sheet. After curing the adhesive, the organic resin film is laminated on the surface of the metal sheet and then is heated in an oven with a large heat capacity for several minutes. After that, the organic resin film laminated metal sheet is cooled.

The second method is one in which an adhesive coated organic resin film is used. In this case, the organic resin film is laminated on the surface of the metal sheet and then is also heated in the same type of oven as in the first method.

However, the organic resin film laminated metal sheet can not be produced at high speed by these methods because a long time is required for curing the adhesive and heating after lamination of the organic resin film. In some cases, the characteristics of the organic resin film are deteriorated by heating for a long time and the laminated organic resin film may be peeled off from the surface of the metal sheet by severe forming because the formability of the adhesive is not good.

Recently, a process for laminating a biaxially oriented polyester resin film to a metal sheet without an adhesive such as thermosetting resin has been proposed in U.S. patent application Ser. No. 398,694, filed July 15, 1982. This method comprises laminating a biaxially oriented polyester resin film on the metal sheet which is heated to a temperature above the melting point of said polyester resin film and then immediately quenching. This method is suitable for the continuous lamination of the polyester resin film to the metal sheet at high speed, because sufficient bonding strength of the polyester resin film to the metal sheet is obtained by heating for a short time. However, in some applications, the polyester resin film laminated metal sheet by this method is reheated at a temperature of 160° to 200° C. for about 10 to 30 minutes, because color printing or lacquer coating on the other side of the metal sheet wherein the polyester resin film is laminated is carried out before forming. In this case, a part of polyester resin film may be peeled off in a severely formed part after a treatment by hot water or hot steam, because an amorphous polyester resin layer formed at the interface of the biaxially oriented polyester resin film and the metal sheet by heating at a temperature above the melting point of polyester resin film is recrystallized by reheating at a temperature of 160° to 200° C. for a long time. Therefore the polyester resin film laminated metal sheet produced by this method is not sufficiently used for the applications wherein lacquer coating or color printing is required.

Furthermore, in Japanese Patent Publication No. Sho 57-22750, a copolymerized polyester resin film is used for the lamination to the metal sheet without an adhesive such as a thermosetting resin. However, this resin film is only used for this limited application because this film is expensive compared with epoxy phenolic lacquer which is widely used in the can producing industry.

On the other hand, in the can producing industry, a continuous lacquer coating at high speed on the metal sheet has been investigated in order to decrease the production cost. However, such a process is too difficult to practice industrially, because a lacquer which can be cured by heating for a few seconds has not yet been developed. Moreover, the corrosion resistance after severe forming of the lacquer coated metal sheet is poor as compared with that of the organic resin film laminated metal sheet.

Accordingly, it is the first objective of the present invention to provide a metal sheet covered with biaxially oriented polyester resin film having an excellent adhesion of polyester resin film to the metal sheet and excellent corrosion resistance in a severely formed part even after a treatment by hot water or hot steam, more specifically, in the formed part after reheating for curing the color printing ink or lacquer at the temperature of 160° to 200° C. for a long time, as compared with that of the lacquer coated metal sheet and other organic resin film laminated metal sheets.

It is the second objective of the present invention to provide a method for the continuous lamination of biaxially oriented polyester resin film on one or both surfaces of the metal sheet at high speed.

BRIEF DESCRIPTION OF THE INVENTION

The first objective of the present invention can be accomplished by the formation of double layers consisting of an upper layer of biaxially oriented polyester resin film and a lower layer of thin epoxy resin layer containing a curing agent of epoxy resin on the metal sheet covered with double layers consisting of an upper layer of a hydrated chromium oxide and a lower layer of metallic chromium.

The second objective of the present invention can be accomplished by the continuous lamination of biaxially oriented polyester resin film precoated with epoxy resin containing a curing agent of epoxy resin on the metal sheet heated to a temperature of 220° C. to below the melting point of the polyester resin film at high speed. The present invention is characterized by the use of biaxially oriented polyester resin film having a thin epoxy resin layer containing a curing agent of epoxy resin, by heating the metal sheet just before lamination of said polyester resin film to a temperature of 220° C. to below the melting point of the polyester resin film and by the use of the metal sheet covered with double layers consisting of an upper layer of hydrated chromium oxide and a lower layer of metallic chromium.

The metal sheet according to the present invention can be used in application wherein excellent corrosion resistance after severe forming is required, such as drawn cans, drawn and redrawn cans (DR can) as well as can ends.

In these applications, these cans are exposed to hot water or hot steam for the pasteurization of food after packing food such as fruit juices, coffee, meat and fish. For example, fruit juices are immediately hot-packed in the can after pasteurization at a temperature of 90° to 100° C. and coffee, meat and fish are pasteurized by hot steam at a temperature above 100° C. in a retort after being packed in the can at 90° to 100° C.

In some applications, color printing or lacquer coating on one side of the metal sheet used for the outside of these cans is carried out before forming and after that these cans can be used in applications described above.

When the polyester resin film laminated metal sheet without double layers consisting of hydrated chromium oxide and metallic chromium or the polyester resin film laminated metal sheet wherein polyester resin film is laminated to the metal sheet heated to a temperature above the melting point of the polyester resin film is used for the applications wherein color printing or lacquer coating is carried out, a part of polyester resin film may be peeled off in a severely formed part. On the other hand, in the case of the metal sheet according to the present invention, the laminated polyester resin film is not at all peeled off in a severely formed part even after reheating for curing a printing ink or lacquer and then a treatment by hot water or hot steam.

DETAILED DESCRIPTION OF THE INVENTION

In the present invention, the employed biaxially oriented polyester resin film is prepared by processing according to a known method a polyester resin which is produced by the esterification of at least one saturated polycarboxylic acid by at least one saturated polyalcohol selected from the following polycarboxylic acids and polyalcohols.

Saturated polycarboxylic acids are selected from phthalic acid, isophthalic acid, terephthalic acid, succinic acid, azelaic acid, adipic acid, sebacic acid, 2,6-naphthalene dicarboxylic acid, 1,4-cyclohexane dicarboxylic acid and trimellitic acid anhydride.

Saturated polyalcohols are selected from ethylene glycol, 1,4-butanediol, 1,5-pentanediol, 1-6-hexanediol, propylene glycol, 1,4-dimethanol cyclohexane, trimethylol propane and pentaerythritol.

In some cases, additives such as antioxidants, stabilizers, pigments, antistatic agents and corrosion inhibitors are added during the manufacturing process of the polyester resin film used for the present invention.

In the present invention, the use of polyethylene terephthalate film having a biaxial oriented structure is especially desirable from the viewpoint of corrosion resistance and economy.

The thickness of the polyester resin film used in the present invention should be 5–50 μm, preferably 10–30 μm.

If the thickness of the employed polyester resin film is below 5 μm, the excellent corrosion resistance after severe forming in the metal sheet according to the present invention is not obtained and the lamination of thin polyester resin film becomes remarkably difficult. Moreover, the use of the polyester resin film having a thickness above 50 μm is not economically suitable for the film to be laminated to the metal sheet, because the polyester resin film used for the present invention is expensive as compared with epoxy phenolic lacquers widely used in the can industry and other organic resin films such as polypropylene film.

It is desirable in the present invention that an epoxy resin having an epoxy equivalent of 400 to 4000 be used for precoating to the one side of polyester film to be laminated to the metal sheet. If epoxy resin having an epoxy equivalent of below 400 is used, it is impossible to uncoil the polyester resin film precoated with epoxy resin, because the tackiness of epoxy resin remains even after the removal of solvent added for continuous coating of epoxy resin to the polyester resin film by heating at a temperature of 60° to 150° C. in an oven. If an epoxy resin having an epoxy equivalent of above 4000 is used, the formed epoxy resin layer does not have excellent bonding strength for the metal sheet and biaxially oriented polyester resin film.

In the present invention, the curing agent added to epoxy resin precoated to the polyester resin film should be selected from the group consisting of compounds of phenol resin, urea resin, amide resin, ester resin, acrylic resin and urethane resin. The amount of curing agent added to epoxy resin should be 5 to 100 parts per 100 parts of epoxy resin. If the amount of curing agent is below 5 parts per 100 parts of epoxy resin, the precoated epoxy resin does not sufficiently harden by heating. At above 100 parts of curing agent per 100 parts of epoxy resin, the formability of the formed epoxy resin layer after hardening becomes remarkably poor.

The amount of epoxy resin containing curing agent of epoxy resin precoated to the polyester resin film, which is an important factor in the present invention, should be 0.1 to 5.0 g/m$^2$, preferably 0.5 to 2.0 g/m$^2$ after drying at the temperature of 60° to 150° C.

It is desirable in the present invention that the epoxy resin containing a curing agent of epoxy resin will be coated on the biaxially oriented polyester resin film as uniformly and thinly as possible because the bonding strength of epoxy resin layer to the metal sheet and the polyester resin film becomes gradually poor with an increase of the thickness of the epoxy resin layer. However, it is very difficult to uniformly coat the amount of below 0.1 g/m$^2$ of epoxy resin containing a curing agent therefor on the polyester resin film. At above 5.0 g/m$^2$ of epoxy resin containing a curing agent therefor, coated on the polyester resin film, the bonding strength of epoxy resin layer to the metal sheet and the polyester resin film becomes remarkably poor in a severely formed part after a treatment by hot water or hot steam.

The temperature for drying the epoxy resin containing curing agent therefor dissolved in a solvent which is coated on the polyester resin film is also one of the important factors in the present invention. If the temperature is below 60° C., a long time is necessary for the removal of solvent which is added for the dissolution of epoxy resin and curing agent therefor. At above 150° C. of drying temperature, the reaction of epoxy resin and curing agent coated on the polyester resin is accelerated, and then the bonding strength of epoxy resin layer to the metal sheet becomes remarkably poor.

It is suitable in the present invention that an epoxy resin containing a curing agent therefor, be dissolved in a solvent. Such solution is coated on the biaxially oriented polyester resin film and is dried in the range of 5 to 30 seconds at a temperature of 60° to 150° C. At below 5 seconds, the solvent is not sufficiently removed and at above 30 seconds, the production of the polyester resin film laminated metal sheet at high speed is difficult.

It is preferable in the present invention that a solvent be added for the dissolution of epoxy resin and curing agent of epoxy resin. The solvent having low boiling point should be used for the dissolution of epoxy resin and curing agent of epoxy resin because it is easily removed by heating at 60° to 150° C., although it is not specifically limited.

In some cases, a coloring agent such as dye may be added to the epoxy resin and curing agent therefor dissolved in a solvent.

In the present invention, the presence of an optimum amount of hydrated chromium oxide and metallic chromium is very important for excellent bonding strength of the polyester resin film precoated with epoxy resin containing a curing agent therefor, to the metal sheet when said polyester resin film laminated metal sheet is exposed in hot water or hot steam after severe forming.

The optimum range for the amount of hydrated chromium oxide as chromium and metallic chromium is 3 to 50 mg/m$^2$ and 30 to 200 mg/m$^2$, preferably 8 to 20 mg/m$^2$ and 70 to 150 mg/m$^2$, respectively, on said metal sheet.

If the amount of hydrated chromium oxide as chromium is below 3 mg/m$^2$ or above 50 mg/m$^2$, the adhesion of polyester resin film precoated with epoxy resin containing curing agent therefor, to the metal sheet may become poor in a severely formed part, when said polyester resin film laminated metal sheet is exposed to hot water or hot steam. In the case of below 30 mg/m$^2$ of metallic chromium, the adhesion of said polyester resin film may also become poor, even if the amount of hydrated chromium oxide as chromium is 3 to 50 mg/m$^2$. The deposition of metallic chromium above 200 mg/m$^2$ is not suitable in the continuous production of said polyester resin film laminated metal sheet according to the present invention at high speed, although the adhesion of said polyester resin film does not become remarkably poor.

In some applications, the polyester resin film laminated metal sheet according to the present invention is reheated at a temperature of about 160° to 200° C., because color printing or lacquer coating of the other side of said polyester resin film laminated metal sheet is carried out before forming. In this case, it is more desirable to use a metal sheet covered with double layers consisting of a lower layer of metallic chromium oxide of 30 to 200 mg/m$^2$ and an upper layer of hydrated chromium oxide of 3 to 50 mg/m$^2$ as chromium, and having restricted amounts of sulfur and fluorine in said hydrated chromium oxide. It is desirable that the amount of sulfur and fluorine in said hydrated chromium oxide be 0.1 to 2.5 atomic % and 0.5 to 10 atomic % in the atomic ratio of sulfur and fluorine to the total of chromium, oxygen, sulfur and fluorine, respectively. Then the adhesion of said polyester resin film in a severely formed part, under a wet atmosphere, is remarkably good.

Hydrogen also exists as a hydroxyl radical and as bonded water in said hydrated chromium oxide. Therefore, the atomic ratio of hydrogen should also be restricted. However, it is represented by the atomic ratio of oxygen, because hydrogen exists with oxygen described above, and it is therefore apparent that the atomic ratio of hydrogen is in fact so restricted.

It is assumed that the excellent adhesion of said polyester resin film to the metal sheet is mainly ensured by the presence of hydroxyl radical or bonded water in the hydrated chromium oxide.

Therefore, the presence of a high amount of sulfur existing as a sulfate radical and fluorine is not desirable so as to ensure the excellent adhesion of said polyester resin film, because the amount of hydroxyl radical or bonded water in said hydrated chromium oxide, which is necessary to ensure the excellent adhesion of said polyester resin film, is decreased by the substitution of hydroxyl radical or bonded water by sulfate radical or fluorine.

In the present invention, the reason why the permissible range of the atomic ratio of fluorine is wider than that of sulfur is considered to be that fluorine incorporated into the hydrated chromium oxide layer does not disturb the construction of the hydrated chromium oxide as much as does the sulfate radical, because fluorine has nearly the same volume as the hydroxyl radical or bonded water and sulfate radical has nearly the same volume as trivalent chromium coordinated by a hydroxyl radical or bonded water with a coordination number of 6.

As stated above, the presence of sulfate radical and fluorine in said hydrated chromium oxide is not desirable from the standpoint of excellent adhesion of said polyester resin film. However, in order to efficiently form a uniform hydrated chromium oxide layer with a uniform metallic chromium layer, it is indispensable to add at least one additive selected from the group consisting of sulfur compounds (e.g., sulfuric acid, phenolsulfonic acid or an ammonium or alkali metal sulfate, phenolsulfonate, sulfite or thiosulfate) and fluorine compounds (e.g., an ammonium or alkali metal fluoride, fluoborate or fluosilicate, or acid thereof, i.e. hydrofluoric acid, fluoboric acid, fluosilicate acid, ammonium bifluoride or an alkali metal bifluoride) to the chromic acid electrolyte solution.

It is more desirable to use a chromic acid electrolyte containing only a fluorine compound, for example, those disclosed in Japanese Patent Publication No. Sho 49-25537, compared with the chromic acid electrolyte containing sulfur compounds such as sulfuric acid, from the viewpoint described above.

The metal sheet should be selected from the group consisting of aluminum sheets, steel sheets, steel sheets plated with below 3.0 g/m$^2$ of nickel, steel sheets plated with below 1.0 g/m$^2$ of tin and steel sheets plated with below 3.0 g/m$^2$ of nickel and below 1.0 g/m$^2$ of tin, because the metal sheet herein is used for sanitary food cans as described above. The amount of plated nickel should be below 3.0 g/m$^2$ in the continuous production of the metal sheet at high speed. The amount of plated tin should be limited to below 1.0 g/m$^2$. If plated tin is above 1.0 g/m$^2$, the adhesion of said polyester resin film becomes remarkably poor, because a greater part of plated tin remains as free tin without the formation of iron-tin alloy by heating just before the lamination of said polyester resin film. If the amount of plated nickel and tin is below 0.01 g/m$^2$ and 0.05 g/m$^2$, respectively, the effect of plated nickel and tin on the characteristics of the metal sheet is hardly apparent, despite the addition of a further plating process.

The temperature of the metal sheet heated just before the lamination of the polyester resin film precoated with epoxy resin containing curing agent of epoxy resin, which is also one of the important factors in the present invention, should be maintained in the range of 220° C. to below the melting point of the polyester resin film, preferably 230° to 255° C.

If the temperature of the metal sheet heated just before the lamination of said polyester resin film is above the melting point of the polyester resin film, the corrosion resistance in a severely formed part of the polyester resin laminated metal sheet according to the present invention deteriorates after a treatment by hot water or hot steam, because a part of biaxially oriented polyester resin film changes to amorphous structure on the lower side of the employed biaxially oriented polyester resin film contacting the metal sheet heated to a temperature above the melting point of the polyester resin film. Furthermore, in the case of reheating for curing a printing ink or lacquer, the adhesion of said polyester resin film to the metal sheet becomes remarkably poor in a severely formed part after a treatment by hot water or hot steam, because the formed amorphous polyester resin film is recrystallized by reheating.

At below 220° C., the excellent bonding strength of said polyester resin film to the metal sheet is not obtained. Namely, it is considered that the excellent corrosion resistance and the excellent bonding strength of said polyester resin film to the metal sheet are obtained by the lamination of biaxially oriented polyester resin film precoated with epoxy resin containing curing agent of epoxy resin without the structural change of the employed polyester resin film.

In the present invention, the method for heating the metal sheet to which the polyester resin film precoated with epoxy resin containing curing agent of epoxy resin is laminated is not limited. However, from the standpoint of continuous and stable production of the polyester resin film laminated metal sheet according to the present invention, induction heating and resistance heating, which are used for reflowing tinplate in the conventional process for production of electrotinplate and a roller heated by electrical method, are suitable for heating the metal sheet to be laminated, because the metal sheet to be laminated is rapidly heated and the temperature of the heated metal sheet is easily controlled. Namely, it is desirable in the present invention that the metal sheet to be laminated is heated in the range of 1 to 30 seconds. A roller heated by hot steam is also used for the preliminary heating of the metal sheet to be laminated.

A method for cooling after the lamination of polyester resin film to the metal sheet is not limited to rapidly cooling or gradually cooling, because the obtained characteristics do not change by both methods.

The present invention is explained in further detail by reference to the following examples.

EXAMPLE 1

A cold rolled steel sheet having a thickness of 0.21 mm was electrolytically degreased in a solution of 70 g/l sodium hydroxide and then pickled in a solution of 100 g/l sulfuric acid. The steel sheet, after being rinsed with water, was cathodically treated by using an electrolyte consisting Of 60 g/l of $CrO_3$ and 3 g/l of NaF in water under 20 $A/dm^2$ of cathodic current density at an electrolyte temperature of 50° C. The thus treated steel sheet was rinsed with hot water having a temperature of 80° C. and dried.

After that, a biaxially oriented polyester resin film precoated with epoxy resin containing curing agent of epoxy resin by the following conditions was laminated on the thus treated steel sheet under the following conditions.

Conditions for precoating epoxy resin containing curing agent of epoxy resin to the polyester resin film Thickness of biaxially oriented polyester resin film: 16 μm Composition of precoated material:
  Epoxy resin: 100 parts
  Resol produced from paracresol (Curing agent): 25 parts
  Epoxy equivalent of epoxy resin: 3000
Drying temperature of precoated epoxy resin: 120° C.
Drying time of precoated epoxy resin: 10 seconds
Amount of epoxy resin containing curing agent of epoxy resin after drying at 120° C.: 1.0 $g/m^2$ Conditions for lamination of polyester resin film prepared by the conditions described above Method for heating the treated steel sheet: Roller heated by induction heating
Temperature of the treated steel sheet just before lamination: 245° C.
Method for cooling the laminate: Gradually cooling

EXAMPLE 2

The steel sheet was electroplated with 0.6 $g/m^2$ of nickel by using a Watt's bath consisting of 40 g/l of $NiCl_2.6H_2O$, 250 g/l of $NiSO_4.6H_2O$ and 40 g/l of $H_3BO_3$ in water under 10 $A/dm^2$ of cathodic current density at a bath temperature of 40° C. after the pretreatment as in Example 1. After rinsing with water, the nickel plated steel sheet was cathodically treated by using an electrolyte consisting of 80 g/l of $CrO_3$, 0.35 g/l of $H_2SO_4$ and 0.6 g/l of $HBF_4$ in water under 30 $A/dm^2$ of cathodic current density at an electrolyte temperature of 55° C. The thus treated steel sheet was rinsed with hot water having a temperature of 80° C. and was dried.

After that, a biaxially oriented polyester resin film precoated with epoxy resin containing curing agent of epoxy resin by the following conditions was laminated on the thus treated steel sheet under the following conditions.

Conditions for precoating epoxy resin containing curing agent of epoxy resin to the polyester resin film Thickness of biaxially oriented polyester resin film: 12 μm Composition of precoated material:
  Epoxy resin: 100 parts
  Isocyanate resin (Curing agent): 30 parts
  Epoxy equivalent of epoxy resin: 2000
Drying temperature of precoated epoxy resin: 100° C.
Drying time of precoated epoxy resin: 20 seconds
Amount of epoxy resin containing curing agent: herefor after drying at 100° C.: 0.5 $g/m^2$ Conditions for lamination of polyester resin film prepared by the conditions described above Method for heating the treated steel sheet: Roller heated by induction heating
Temperature of the treated steel sheet just before lamination: 240° C.
Method for cooling the laminate: Gradually cooling

EXAMPLE 3

The steel sheet was electroplated with 0.3 g/m² of tin by using an electrolyte consisting of 25 g/l of stannous sulfate, 15 g/l of phenolsulfonic acid (60% aqueous solution) and 2 g/l of ethoxylated α-naphthol sulfonic acid in water under 20 A/dm² of cathodic current density at an electrolyte temperature of 40° C. after the pretreatment as in Example 1. After rinsing with water, the tin plated steel sheet was cathodically treated by using an electrolyte consisting of 50 g/l of $CrO_3$ and 0.5 g/l of $H_2SO_4$ in water under 25 A/dm² of cathodic current density at an electrolyte temperature of 50° C. The thus treated steel sheet was rinsed with hot water having a temperature of 85° C. and dried.

After that, a biaxially oriented polyester resin film precoated with epoxy resin containing curing agent therefor by the following conditions was laminated on the thus treated steel sheet under the following conditions.

Conditions for precoating epoxy resin containing curing agent of epoxy resin to the polyester resin film Thickness of biaxially oriented polyester resin film: 19 μm
Composition of precoated material:
  Epoxy resin: 100 parts
  Urea resin (Curing agent): 40 parts
  Gold dye: 5 parts
  Epoxy equivalent of epoxy resin: 550
Drying temperature of precoated epoxy resin: 130° C.
Drying time of precoated epoxy resin: 5 seconds
Amount of epoxy resin containing curing agent of epoxy resin after drying at 130° C.: 2 g/m²

Conditions for lamination of polyester resin film prepared by the conditions described above Method for heating the treated steel sheet: Induction heating
Temperature of the treated steel sheet just before lamination: 255° C.
Method for cooling the laminate: Rapid cooling to below 100° C. after 5 seconds

EXAMPLE 4

An aluminum sheet (JIS 3004) having a thickness of 0.21 mm was cathodically degreased in a solution of 30 g/l sodium carbonate. After being rinsed with water, the aluminum sheet was cathodically treated by using an electrolyte consisting of 50 g/l of $CrO_3$, 0.3 g/l of $H_2SO_4$ and 0.16 g/l of $HBF_4$ in water under 20 A/dm² of cathodic current density at an electrolyte temperature of 55° C. The thus treated aluminum sheet was rinsed with hot water having a temperature of 80° C. and dried.

After that, a biaxially oriented polyester resin film precoated with epoxy resin containing a curing agent therefor by the following conditions was laminated on the thus treated aluminum sheet under the following conditions.

Conditions for precoating epoxy resin containing curing agent of epoxy resin to the polyester resin film Thickness of biaxially oriented polyester resin film: 16 μm
Composition of precoated material:
  Epoxy resin: 100 parts
  Resol produced from paracresol (Curing agent): 10 parts
  Yellow dye: 10 parts
  Epoxy equivalent of epoxy resin: 1000
Drying temperature of precoated epoxy resin: 85° C.
Drying time of precoated epoxy resin: 25 seconds
Amount of epoxy resin containing curing agent of epoxy resin after drying at 85° C.: 1.5 g/m²

Conditions for lamination of polyester resin film prepared by the conditions described above Method for heating the treated aluminum sheet: Roller heated by induction heating
Temperature of the treated aluminum sheet just before lamination: 250° C.
Method for cooling the laminate: Gradually cooling cl

COMPARATIVE EXAMPLE 1

The steel sheet was cathodically treated under the conditions of Example 1 after the pretreatment as in Example 1. The treated steel sheet was rinsed with hot water having a temperature of 80° C. and dried.

After that, the treated steel sheet was cured at 210° C. for 12 minutes after coating with 100 mg/dm² of an epoxy-phenolic lacquer used for drawn cans.

COMPARATIVE EXAMPLE 2

The steel sheet was electroplated with 0.6 g/m² of nickel under the conditions of Example 2 after the pretreatment as in Example 1. After being rinsed with water, the nickel plated steel sheet was cathodically treated by using an electrolyte consisting of 30 g/l of $CrO_3$ and 1.5 g/l of NaF in water under 20 A/dm² of cathodic current density at an electrolyte temperature of 55° C. The thus treated steel sheet was rinsed with hot water having a temperature of 80° C. and dried.

After that, a biaxially oriented polyester resin film prepared under the conditions of Example 2 was laminated on the treated steel sheet under the conditions of Example 2.

COMPARATIVE EXAMPLE 3

The steel sheet was electroplated with 0.3 g/m² of tin under the conditions of Example 3 after the pretreatment as in Example 1. After being with water, the tin plated steel sheet was cathodically treated under the conditions of Example 3 and then was rinsed with hot water having a temperature of 80° C. and dried.

After that, a biaxially oriented polyester resin film having a thickness of 25 μm was laminated on the thus treated steel sheet under the following conditions.

Conditions for the lamination of polyester resin film

Temperature of the treated steel sheet just before lamination: 290° C.
Method for cooling the laminate: Rapid cooling by water quenching

COMPARATIVE EXAMPLE 4

The aluminum sheet was rinsed with water and dried after the pretreatment as in Example 4.

After that, a biaxially oriented polyester resin film prepared under the conditions of Example 4 was laminated on the aluminum sheet under the conditions of Example 4.

The adhesion of polyester resin film to the metal sheet and the corrosion resistance after forming were evaluated by the following methods, after the measurement of the coating weight on the resultant steel sheet and aluminum sheet by the X-ray fluorescent method, the results of which are shown in the Table.

(1) Corrosion resistance after forming

The polyester resin film laminated samples and the lacquered sample was cut to a circular blank having a diameter of 80 mm by a punch press, and the blank was deeply drawn to form a cup in which the polyester resin film laminated side and lacquered side was inside at a drawn ratio of 2.0.

50 ml of 3% citric acid was filed into the drawn cup, and the iron or aluminum pick up was measured after aging for 30 days at 37° C.

(2) The adhesion of the polyester resin film to the metal sheet after the retort treatment.

The drawn cup prepared by the method described in (1) above was set in a retort into which steam, heated to 125°–130° C. under a pressure of 1.6–1.7 kg/cm$^2$, was blown for 1 hour. After that, the adhesion of the polyester resin film or the lacquer film was divided into 5 ranks, namely 5 was excellent, 4 was good, 3 was fair, 2 was poor and 1 was bad.

(3) The adhesion of the polyester resin film to the metal sheet which is reheated before forming, after the retort treatment.

The polyester resin film laminated samples and the lacquered sample was reheated at a temperature of 200° C. for 10 minutes and then was formed to drawn cup by the method described in (1) above. After that, the drawn cup was tested under the conditions as shown in (2).

TABLE

|  | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| Base steel | Steel | Steel | Steel | Aluminum | Steel | Steel | Steel | Aluminum |
| Plated metal (mg/m$^2$) | None | Ni 0.6 | Sn 0.3 | None | None | Ni 0.6 | Sn 0.3 | None |
| *1 Cr$^o$ (mg/m$^2$) | 110 | 90 | 35 | 50 | 108 | 15 | 38 | 0 |
| Cr$^{ox}$ (mg/m$^2$) | 14 | 30 | 7 | 6 | 15 | 12 | 8 | 0 |
| *2 S (Atomic %) | 0.5 | 3.4 | 4.0 | 1.7 | 0.5 | 0.3 | 3.7 | 0 |
| F (Atomic %) | 7.0 | 4.1 | 0 | 1.0 | 6.8 | 5.6 | 0 | 0 |
| Fe or Al pick up (ppm) | 0.6 | 0.5 | 0.3 | 0.8 | 8.4 | 0.7 | 0.5 | 3.0 |
| Adhesion of polyester resin film by test (2) | 5 | 5 | 5 | 5 | 5 | 4 | 5 | 3 |
| Adhesion of polyester resin film by test (3) | 5 | 4 | 4 | 5 | 5 | 3 | 3 | 2 |

Remarks:
*1 Cr$^o$ shows metallic chromium and Cr$^{ox}$ shows chromium in the hydrated chromium oxide formed by an electrolytic chromic acid treatment.
*2 S represents sulfur present as sulfate radical and F represents fluorine incorporated in the formed hydrated chromium oxide.

We claim:

1. A method for laminating a biaxially oriented polyester resin film, which has been precoated with an epoxy resin containing a curing agent for the epoxy resin, to a metal sheet covered with double layer consisting of an upper layer of hydrated chromium oxide containing sulfur and fluorine, wherein the atomic ratio of sulfur and fluorine to the total of chromium, oxygen, sulfur and fluorine in the hydrated chromium oxide is 0.1 to 2.5 atomic percent and 0.5 to 10 atomic percent, respectively and a lower layer of metallic chromium, which comprises heating the metal sheet to a temperature of 220° C. to below the melting point of said polyester resin film, and then contacting the surface of said polyester resin film precoated with epoxy resin containing the curing agent for the epoxy resin with the metal sheet.

2. The method according to claim 1 wherein said polyester resin film is prepared by processing polyester resin produced by the esterification of a saturated polycarboxylic acid selected from the group consisting of phthalic acid, isophthalic acid, terephthalic acid, succinic acid, azelaic acid, adipic acid, sebacic acid, 2,6-naphthalene dicarboxylic acid, 1,4-cyclohexane dicarboxylic acid and trimellitic acid anhydride with a saturated polyalcohol selected from the group consisting of ethylene glycol, 1,4-butanediol, 1,5-pentanediol, 1,6-hexanediol, propylene glycol, 1,4-dimethanol cyclohexane, trimethylol propane and pentaerythritol.

3. The method according to claim 2 wherein said polyester resin film is a biaxially oriented polyethylene terephthalate film.

4. The method according to claim 1 wherein said epoxy resin has 400 to 4000 of epoxy equivalent.

5. The method according to claim 1 wherein said curing agent of said epoxy resin is at least one compound selected from the group consisting of phenol resin, urea resin, amide resin, ester resin and urethane resin.

6. The method according to claim 1 wherein the amount of said curing agent of said epoxy resin added to said epoxy resin is 5 to 100 parts per 100 parts of said epoxy resin.

7. The method according to claim 1 wherein said epoxy resin containing said curing agent therefor precoated onto said polyester resin film is dried at 60° to 150° C.

8. The method according to claim 1 wherein the amount of said epoxy resin containing said curing agent for said epoxy resin precoated onto said polyester resin film is 0.1 to 5.0 g/m$^2$ after drying at the temperature of 60° to 150° C.

9. The method according to claim 8 wherein the amount of said epoxy resin containing said curing agent of said epoxy resin precoated onto said polyester resin film is 0.5 to 2.0 g/m$^2$ after drying at the temperature of 60° to 150° C.

10. The method according to claim 1 wherein said metal sheet is a sheet or strip of steel or aluminum.

11. The method according to claim 1 wherein said metal sheet is a sheet or strip of steel plated with 0.01 to 3.0 g/m$^2$ of nickel.

12. The method according to claim 1 wherein said metal sheet is a sheet or strip of steel plated with 0.05 to 1.0 g/m² of tin.

13. The method according to claim 1 wherein said metal sheet is a sheet or strip of steel plated with 0.01 to 3.0 g/m² of nickel and 0.05 to 1.0 g/m² of tin.

14. The method according to claim 1 wherein said double layer consists of an upper layer of hydrated chromium oxide having 3 to 50 mg/m² as chromium and a lower layer of metallic chromium of 30 to 200 mg/m².

15. The method according to claim 14 wherein said double layer consists of an upper layer of hydrated chromium oxide having 8 to 20 mg/m² as chromium and a lower layer of metallic chromium of 70 to 150 mg/m².

16. The method according to claim 1 wherein the temperature of said metal sheet covered with a double layer consisting of an upper layer of hydrated chromium oxide and a lower layer of metallic chromium, heated just before the lamination of said polyester resin film, is maintained in the range of 230° to 255° C.

17. The method according to claim 1 wherein the thickness of said polyester resin film is 5 to 50 μm.

18. A metal sheet having polyester resin film laminated on one or both sides thereof in accordance with the process of claim 1.

* * * * *